United States Patent
Liang et al.

(10) Patent No.: US 8,022,822 B2
(45) Date of Patent: Sep. 20, 2011

(54) DATA COLLECTION PROTOCOL FOR WIRELESS SENSOR NETWORKS

(75) Inventors: Chieh-Jan Mike Liang, Bellevue, WA (US); Liqian Luo, Sammamish, WA (US); Nissanka Arachchige Bodhi Priyantha, Redmond, WA (US); Jie Liu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 523 days.

(21) Appl. No.: 12/147,613

(22) Filed: Jun. 27, 2008

(65) Prior Publication Data

US 2009/0322518 A1    Dec. 31, 2009

(51) Int. Cl.
*G08B 1/08* (2006.01)
(52) U.S. Cl. ............................ 340/539.18; 340/539.1
(58) Field of Classification Search ............ 340/539.21, 340/539.18, 539.22
See application file for complete search history.

(56) References Cited

U.S. PATENT DOCUMENTS

| | | | |
|---|---|---|---|
| 6,772,044 B1* | 8/2004 | Mathur et al. | 700/204 |
| 7,002,470 B1 | 2/2006 | Miao | |
| 2005/0063326 A1 | 3/2005 | Ohkuma et al. | |
| 2005/0210340 A1* | 9/2005 | Townsend et al. | 714/701 |
| 2008/0016440 A1 | 1/2008 | Liu et al. | |
| 2008/0191868 A1* | 8/2008 | Lee et al. | 340/539.22 |
| 2009/0154485 A1* | 6/2009 | Park et al. | 370/438 |

FOREIGN PATENT DOCUMENTS

| | | |
|---|---|---|
| WO | WO2005094493 A2 | 10/2005 |
| WO | WO2007079280 A3 | 7/2007 |

OTHER PUBLICATIONS

Sankarasubramaniam, et al. ESRT: EventtoSink Reliable Transport in Wireless Sensor Networks, MobiHoc'03, Jun. 1-3, 2003, Annapolis, Maryland, USA. ACM 1-58113-684-6/03/0006. http://www.sigmobile.org/mobihoc/2003/papers/p177-sankarasubramaniam.pdf. Last accessed May 12, 2008, 12 pages.
Kim, et al. Reliable Transfer on Wireless Sensor Networks http://www.eecs.berkeley.edu/~binetude/work/reliable.pdf. Last accessed May 12, 2008, 11 pages.
Xu, et al. A Wireless Sensor Network for Structural Monitoring. SenSys'04, Nov. 3-5, 2004, Baltimore, Maryland, USA. ACM 1581138792/ 04/0011. http://enl.usc.edu/~srangwal/wisden.pdf. Last accessed May 12, 2008, 12 pages.
Chen, et al. Time Synchronization for Predictable and Secure Data Collection in Wireless Sensor Networks. In: The Sixth Annual Mediterranean Ad Hoc Networking WorkShop, Corfu, Greece, Jun. 12-15, 2007. http://di.ionio.gr/medhocnet07/wp-content/uploads/papers/320.pdf. Last accessed May 12, 2008, 8 pages. Datta. Application-Specific Reliable Data Transfer in Wireless Sensor Networks, Aug. 2007. PhD Dissertation. http://etd.Isu.edu/docs/available/etd-06222007-095426/unrestricted/Datta_dis.pdfu. Last accessed May 12, 2008, 131 pages.
Stann, et al. RMST Reliable Data Transport in Sensor Networks. In: 1st IEEE International Workshop on Sensor Net Protocols and Applications (SNPA). Anchorage, Alaska, USA. May 11, 2003. http://www.isi.edu/~johnh/PAPERS/Stann03a.pdf. Last accessed May 12, 2008, 11 pages.

* cited by examiner

*Primary Examiner* — Travis Hunnings
(74) *Attorney, Agent, or Firm* — Turocy & Watson, LLP

(57) ABSTRACT

Systems and methods that provide for collection of sensor data in a wireless network with a dynamically changing structure. A data collection protocol exploits the self-awareness capabilities of nodes in selection of tree structures that form the wireless network during communication with a base station. The data collection protocol can further include a topology control component (which regulates how nodes are distributed among various tree structures and associated communication channels with the base station) and data retrieval component (which coordinates among the sensors to transmit data packets containing sensor data to efficiently employ available bandwidth).

18 Claims, 10 Drawing Sheets

DATA COLLECTION PROTOCOL FOR WIRELESS SENSOR NETWORKS

BACKGROUND

Computing and networking technologies have transformed many important aspects of everyday life. Computers have become a household staple instead of a luxury, and provide users with a tool to manage and forecast finances, control household operations like heating, cooling, lighting and security, and store records and images in a permanent and reliable medium. Networking technologies like the Internet provide users with virtually unlimited access to remote systems, information and associated applications.

Networked devices both wired and wireless are becoming increasingly prevalent. Conventionally, a number of different networking technologies have been employed for managing and controlling networked devices. For example, network printers are commonly implemented utilizing network-printing protocols over Ethernet. Another example is the X10 network protocol, which is utilized to remotely control devices (e.g., light switches, video cameras . . . ) using a power line network. While these technologies allow devices to be accessed and controlled remotely, many consumers have not availed themselves of the benefit of network devices.

In addition, as such networking technologies become robust, secure and reliable, more industries are shifting paradigms and employing such networks to perform sensing and control operation. For example, network of sensors can be employed to effectuate completion of most industrial controllers and processes. Such industrial controllers can function as special-purpose computers utilized for controlling industrial processes, manufacturing equipment, and other factory automation processes, such as data collection through networked systems. These operations involve front-end processing of materials such as steel production to more intricate manufacturing processes such as automobile production that involve assembly of previously processed materials. Oftentimes, such as in the case of automobiles, complex assemblies can be manufactured with high technology robotics assisting the industrial control process. Such assemblies require close monitoring of operations and data collection.

To achieve fine-grain monitoring, sensors are deployed in a dense setting on the scale of hundreds, so the sensor network can generate a significant amount of data. For data to be useful, these kinds of applications require reliable data collection. In general, a node in a sensor network is a special purpose computer, which can have at least one sensing component, at least a microcontroller (CPU), at least a network interface, such as a wireless radio transceiver. In most wireless network standards, the node can choose to use one of multiple wireless channels.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation provides for collection of sensor data in a wireless network with a dynamically changing structure, via a data collection protocol that communicates with sensors (e.g. nodes that form such structure) directly or via other sensors. Such data collection protocol further exploits the self-awareness capabilities of nodes in selection of tree structures that form the wireless network during communication with a base station. The data collection protocol can further include a topology control component (which regulates how nodes are distributed among various tree structures and associated communication channels with the base station), and a data retrieval component (which coordinates among the sensors to transmit data packets containing sensor data to efficiently employ available bandwidth). Moreover, the data retrieval component can further act as an agent that is located on the base station, and which can retrieve the tree structure that is being built by the network. In addition, the topology control component can further assign a channel to a tree structure, and further employ a channel scanning component (which tracks nodes with corresponding tree structure), a tree building component (which generates the tree structures), a link quality assessment component (which evaluates quality of communication), and a channel balancing component (which direct nodes to use appropriate RF channels).

The tree structure can be configured to include the base station as the root node—with the sensors represented by other nodes branching therefrom. Moreover, the base station can require aid of other sensors to communicate with out-of-range sensors, wherein the sensors can be distributed among a plurality of communication channels, which can change based on the dynamic formation of the wireless network. As such, even though connectivity between nodes is established or severed—sensor data can be reliably collected throughout a substantially dense network. Sensor data can also be stored locally (e.g., a data log) to allow for transition times of configuration changes to the network (e.g., settling times) or for temporary network link failure. As such, the subject innovation enables complete data set to be collected on the sensed phenomenon, wherein a high end-to-end reliability exists between the base station and the sensors. Furthermore, the dynamic configuration of sensor network enables new sensors to join and existing sensors to leave (e.g., fail at any time).

In a related aspect, the base station can periodically send a beacon that designates existence of the base station and identifies it to the nodes. Moreover, a topology request message is sent from the base station to the network that propagates through nodes in the tree and the tree topology is returned, stating the connections therebetween. Subsequently, the base station can follow the tree structure and traverse the nodes with a message asking for retrieval of data, wherein data collected can be returned back to the base station. In a related aspect, an idle sensor can become active upon receipt of the beacon signal (either directly from the base station or from neighboring nodes). The nodes can subsequently identify themselves to a parent node (e.g., a node that is already part of a tree structure and in communication with the base station—either directly or indirectly.) As such, a node in the system can decide to join a tree structure of other nodes based on a quality of signal provided to the base station. For example, a node can select its parent node based on criteria such as Received Signal Strength Indicator (RSSI) and the Link Quality Indicator (LQI), and the like. In addition, a node can transfer to another tree structure during a dynamic change of the network configuration.

According to a methodology of the subject innovation, the base station can periodically transmit a beacon message that traverses all nodes (either directly thereto or through parent nodes of child nodes out of communication range with the base station. A node selection can then performed, wherein a node determines which channel to reside on when joining a tree structure. Subsequently, a quality of signal sent from the node to the base station can be determined assuming that such tree is selected. If such quality is deemed acceptable then the node joins, otherwise another tree structure and/or different channel is examined for the joining act. The tree structure can represent a neighborhood of nodes in a communication range with each other.

To effectively use available communication channels, the protocol decides how many nodes can use each channel based on the quality of the data collection tree on each channel. The quality of the tree can be measured by, for example, the total number of hops in the tree.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
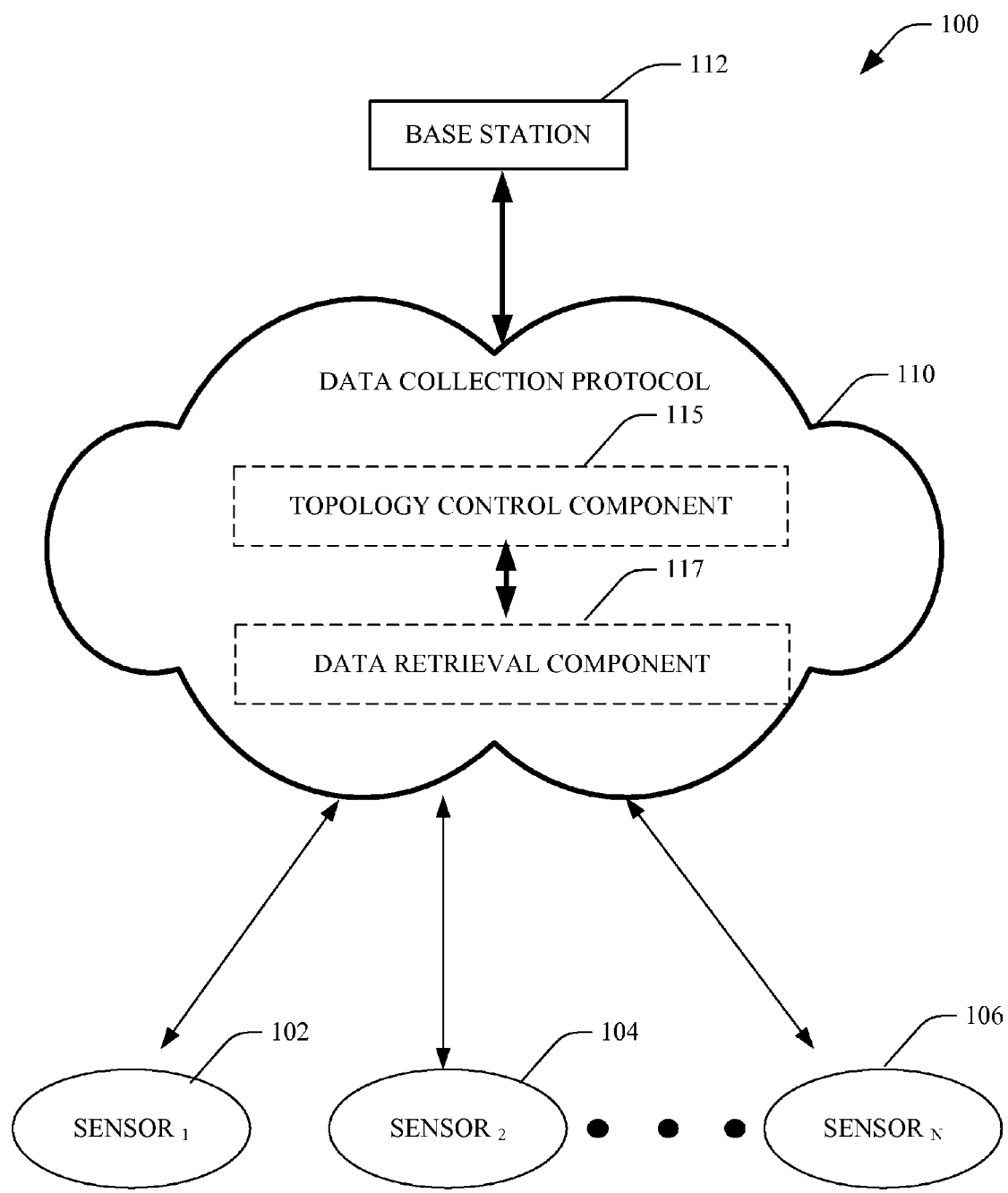
FIG. 1 illustrates a block diagram of a data collection protocol according to an aspect of the subject innovation.

FIG. 1 illustrates a block diagram of a data collection protocol according to an aspect of the subject innovation. The system 100 includes a plurality of sensors 102, 104, 106 denoted as $Sensor_1$, $Sensor_2$, . . . , $Sensor_N$, (where N is an integer.) It is to be appreciated that the sensors 102, 104, 106 can be employed to monitor and/or detect any type of signal and/or physical condition associated with a machine, a person, a process, a product, an environment, and the like. For instance, the sensors 102, 104, 106 can include thermal energy sensors, electromagnetic sensors, mechanical sensors, chemical sensors, optical sensors, radiation sensors, acoustic sensors, biological sensors, ultrasonic sensor(s), photo eye(s), weight detector(s), pressure sensors, humidity sensors, contact switches and the like. As another example, the sensors 102, 104, 106 can detect whether a valve is open, proximity of a worker to a hazardous machine, and a temperature of a resultant product. The sensor data can thereafter be examined, employed to make a modification in operation, displayed, logged, and the like.

Likewise, the sensors 102, 104, 106 can be part of a wireless network that can be a system area network or other type of network, and can include several hosts, (not shown), which may be personal computers, servers or other types of computers. Such host generally can be capable of running or executing one or more application-level (or user-level) programs, as well as initiating an I/O request (e.g., I/O reads or writes). In addition, the networks can further include one or more input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters. As such, the abstraction system 110 can serve as a common language between devices that communicate over various networks, between applications and buses, between processes on a computer and the like.

In addition, the sensors 102, 104, 106 can be part local network that can be, for example, an Ethernet LAN, a token ring LAN, or other LAN. It is further appreciated that that the network can also include a Wide Area Network (WAN). Moreover, various connections can be shared among a plurality of devices connected to the network. Such devices can include, personal computers, workstations, televisions and telephones, for example. Sharing of the connection facilitates reducing the cost of one or more of the LAN devices, and can reduce the complexity of managing the network 114 and optimizes the throughput of the connection.

The wireless network of sensors 102, 104, 106 can have a dynamically changing structure, wherein the sensors can be represented as a set of nodes that cooperate among themselves to form a dynamic and scalable network, and facilitate a systematic collection of sensor data. Such data collection protocol further exploits the self-awareness capabilities of nodes in selection of tree structures that form the wireless network during communication with a base station. The collected data can then be communicated to the base station 112. The base station 112 can be positioned within any number of disparate sensing zones related to different sensors. Moreover, the base stations 112 (and/or any disparate base station(s)) can be Wi-Fi access points (e.g., 802.11), cellular towers, AM radio stations, FM radio stations, TV stations, any other type of electromagnetic transmitting station, and/or a combination thereof. It is to be appreciated that the base stations 112 can be stationary and/or mobile. The base station 112 can further employ a triangulation technique to estimate the location of the sensors 102, 104, 106.

Figure 2:
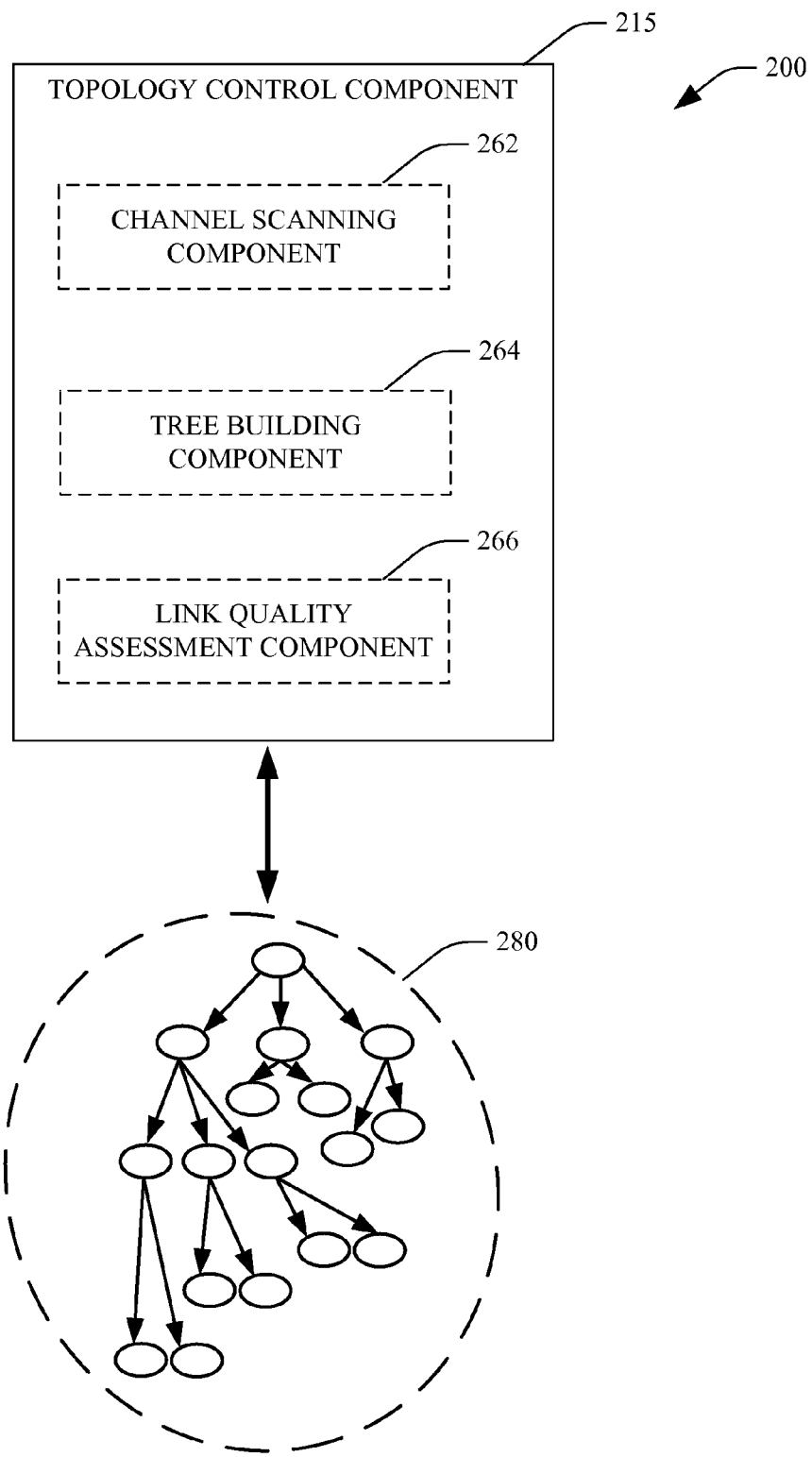
FIG. 2 illustrates an exemplary block for a topology control component that interacts with a dynamic network of nodes in accordance with an aspect of the subject innovation.

As illustrated in FIG. 1, the data collection protocol can further include a topology control component 115 and a data retrieval component 117. The topology control component 115 can regulate how a node or sensor 102, 104, 106 are distributed among various tree structures and associated communication channels with the base station. Likewise, the data retrieval component 117 can coordinate among the sensors 102, 104, 106 to transmit data packets containing sensor data to efficiently employ available bandwidth. It is to be appreciated that FIG. 1 is exemplary in nature and the data topology control component can be part of the FIG. 2 illustrates a system 200 with a topology control component 215 that interacts with a dynamic network of nodes 280 in accordance with an aspect of the subject innovation. The tree structure 280 can be configured to include the base station as the root node—with the sensors represented by other nodes branching therefrom. Moreover, the base station can require aid of other sensors to communicate with out of range sensors, wherein the sensors can be distributed among a plurality of communication channels that can change based on the dynamic formation of the wireless network. As such, even though connectivity between nodes is established or severed—sensor data can be reliably collected throughout a substantially dense network. The topology control component 215 can further include a channel scanning component 262; a tree building component 264; and a link quality assessment component 266. As such, the channel scanning component can track the nodes that form a corresponding tree structure. Likewise, the tree building component 264 can generate such tree structures; and the link quality assessment component can evaluate quality of communication from a node to the base station. As explained earlier, the topology control component 215 can be part of a base station that is implemented upon a central server, which can further communicate with any number of sensors part of the tree structure 280. Accordingly, the base station database can be maintained in a network-accessible database and the sensors can communicate with the base station database to download collected data, as explained in detail infra. For example, the base station database can include beacon or electronic endpoint information that can uniquely identify a radio beacon or an electronic endpoint.

Figure 3:
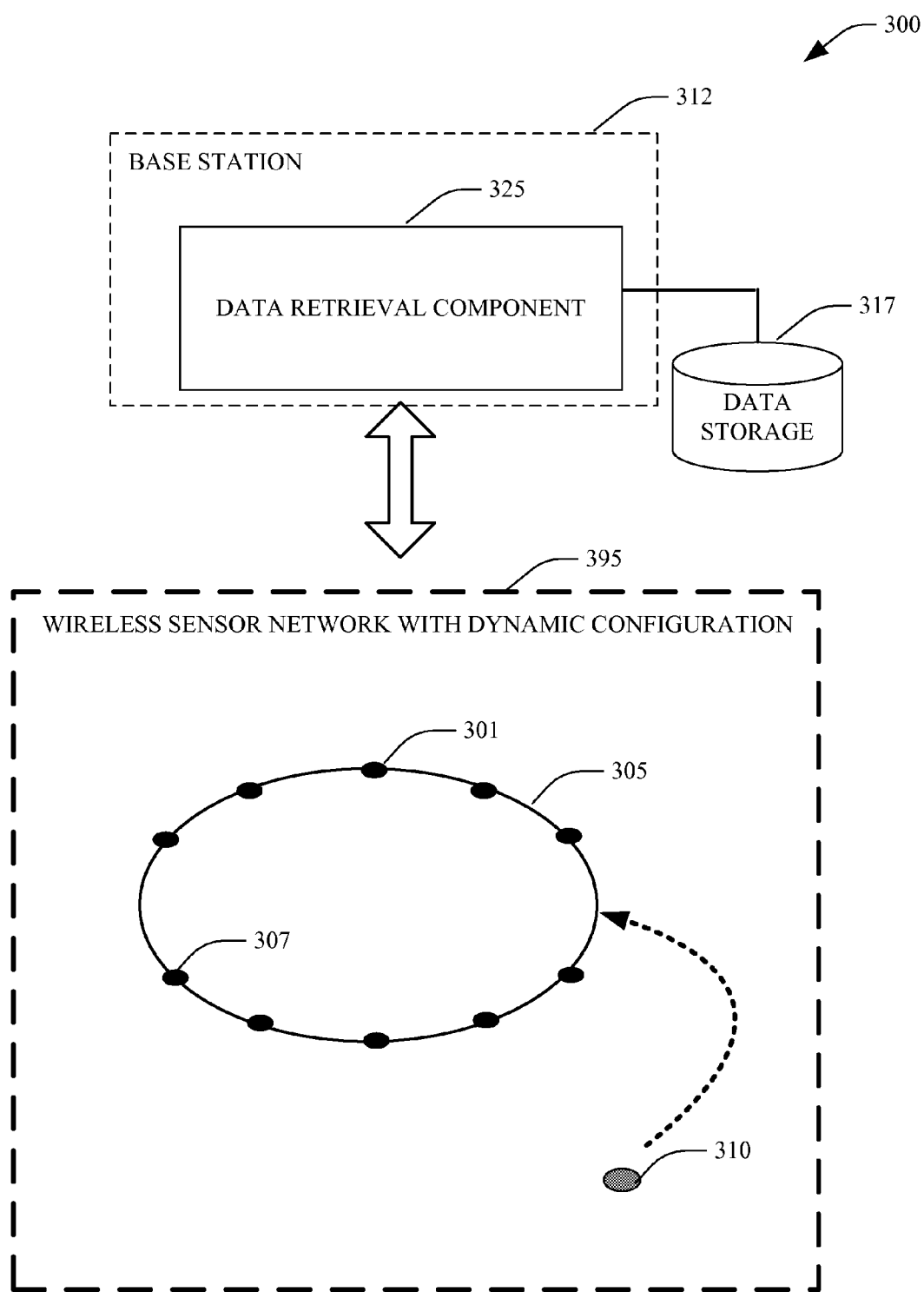
FIG. 3 illustrates a system having a dynamic configuration for a sensor network according to a further aspect of the subject innovation.

FIG. 3 illustrates a system 300 having a dynamic configuration for a sensor network, wherein a sensor 310 can be added to the network 300. The data retrieval component 325 can act as an agent that is located on the base station 312, and which can retrieve the tree structure that is being built by the network 395. Moreover, the base station 312 can periodically send a beacon that designates existence of the base station 312 and identifies it to the nodes 301, 307. In addition, a topology request message is sent from the base station 312 to the network 305 that propagates through nodes in the tree and the tree topology is returned, stating the connections therebetween. Subsequently, the base station 312 can follow the tree structure and traverse the nodes with a message asking for retrieval of data, wherein data collected can be returned back to the base station. As such, the subject innovation enables complete data set to be collected on the sensed phenomenon, wherein a high end-to-end reliability exists between the base station and the sensors. Furthermore, the dynamic configuration of sensor network enables new sensors to join and existing sensors to leave (e.g., fail at any time). In addition to the data storage 317, Sensor data can also be stored locally (e.g., a data log) to allow for transition times of configuration changes to the network (e.g., settling times).

Figure 4:
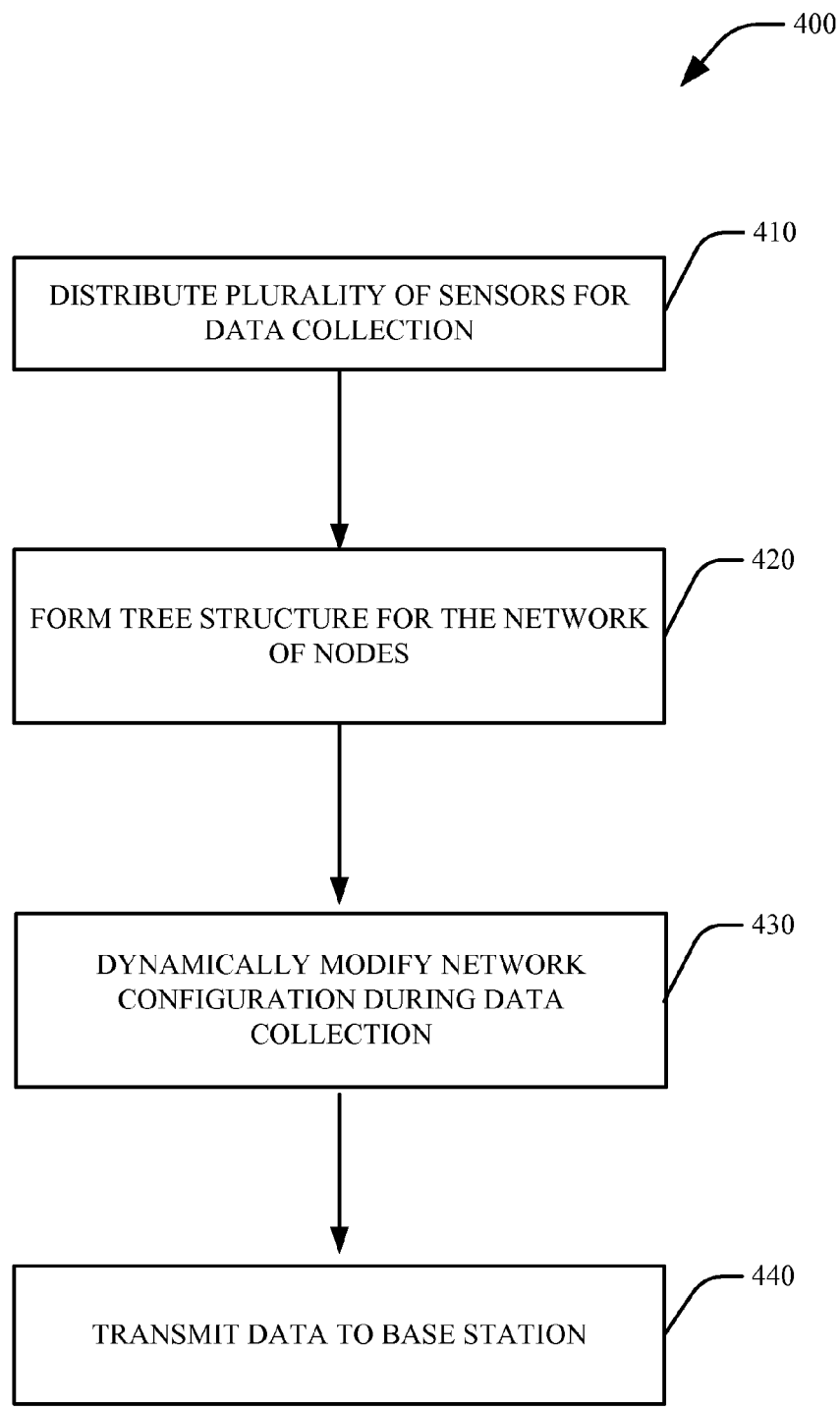
FIG. 4 illustrates a related methodology of data collection from a dynamic network of sensors according to an aspect of the subject innovation.

FIG. 4 illustrates a related methodology 400 of data collection from a dynamic network of sensors according to an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 410, a plurality of sensors can be distributed in an environment (e.g., an industrial setting) for collection of data. Such sensors can form a tree structure of nodes at 420, wherein tree structure is configured to include the base station as the root node. Accordingly, sensors can be represented by other nodes branching therefrom. Moreover, the base station can require aid of other sensors to communicate with the out-of-range sensors. New sensors can join the network and existing sensors can leave (e.g., fail at any time), thus creating a dynamically modifiable network configuration during data collection at 430. Sensor data can also be stored locally (e.g., a data log) to allow for transition times of configuration changes to the network (e.g., settling times). As such, the subject innovation enables complete data set to be collected on the sensed phenomenon, wherein a high end-to-end reliability exists between the base station and the sensors. Data thus collected can then transmitted to the base station for subsequent analysis for operation of interest.

Figure 5:
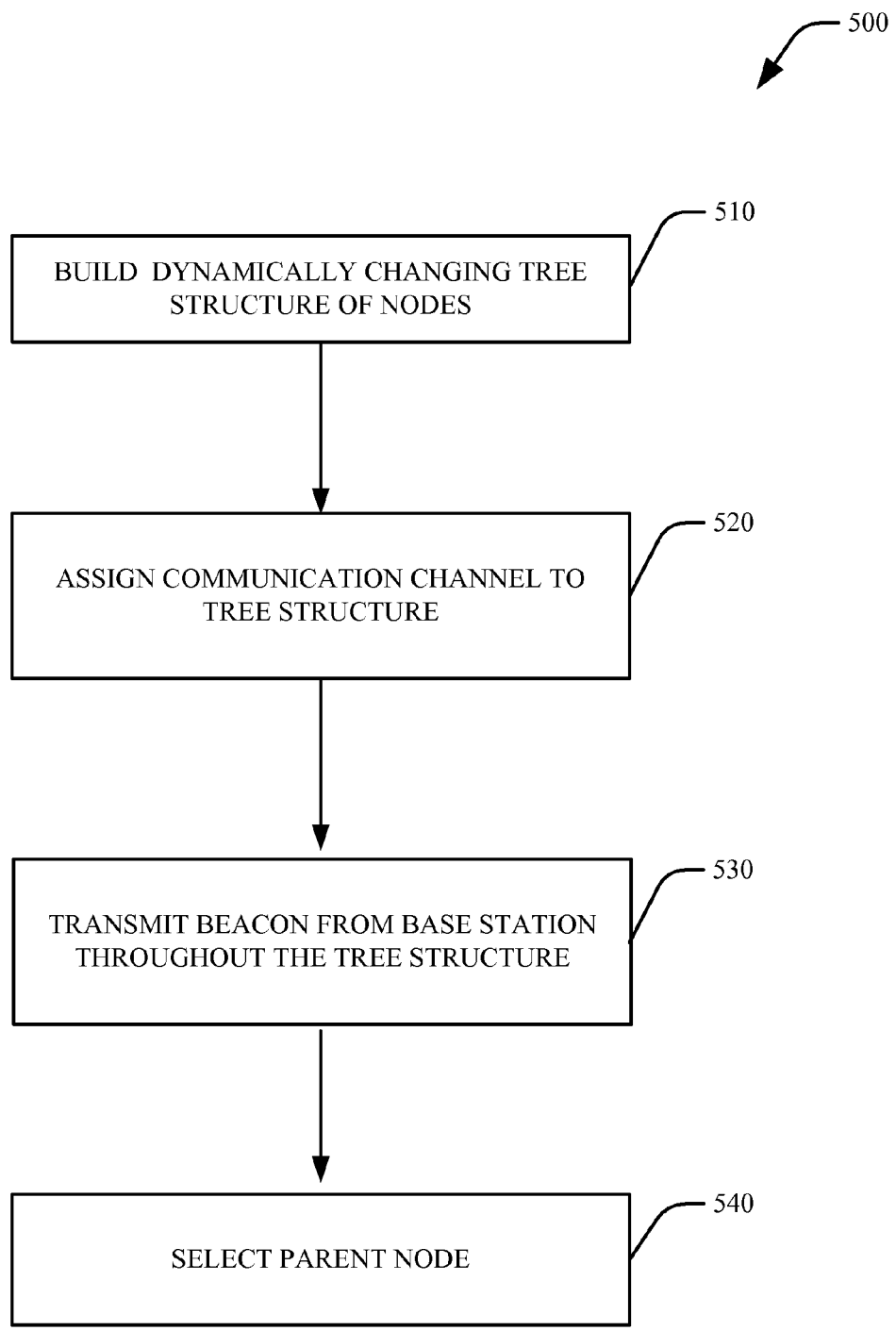
FIG. 5 illustrates a related methodology of accumulating data in a wireless network according to a further aspect of the subject innovation.

FIG. 5 illustrates a related methodology of accumulating data in a wireless network according to a further aspect of the subject innovation. Initially and at 510, a dynamically changing tree structure of nodes representing sensors is generated, wherein even though connectivity between nodes is established or severed—sensor data can be reliably collected throughout a substantially dense network. Next and at 520, a communication channel and part of an existing bandwidth can be assigned to a tree structure. Subsequently and 530, the base station can periodically send a beacon that designates existence of the base station and identifies it to the nodes. Moreover, a topology request message is sent from the base station to the network that propagates through nodes in the tree and the tree topology is returned, stating the connections therebetween. In addition, the base station can follow the tree structure and traverse the nodes with a message asking for retrieval of data, and data collected can be returned back to the base station. An idle sensor can become active upon receipt of the beacon signal (either directly from the base station or from neighboring nodes). The nodes can subsequently identify themselves for selection of a parent node at 540. Such parent node can represent a node that is already part of a tree structure and in communication with the base station—either directly or indirectly. For example, a node can select its parent node based on criteria such as Received Signal Strength Indicator (RSSI) and the Link Quality Indicator (LQI), and the like.

Figure 6:
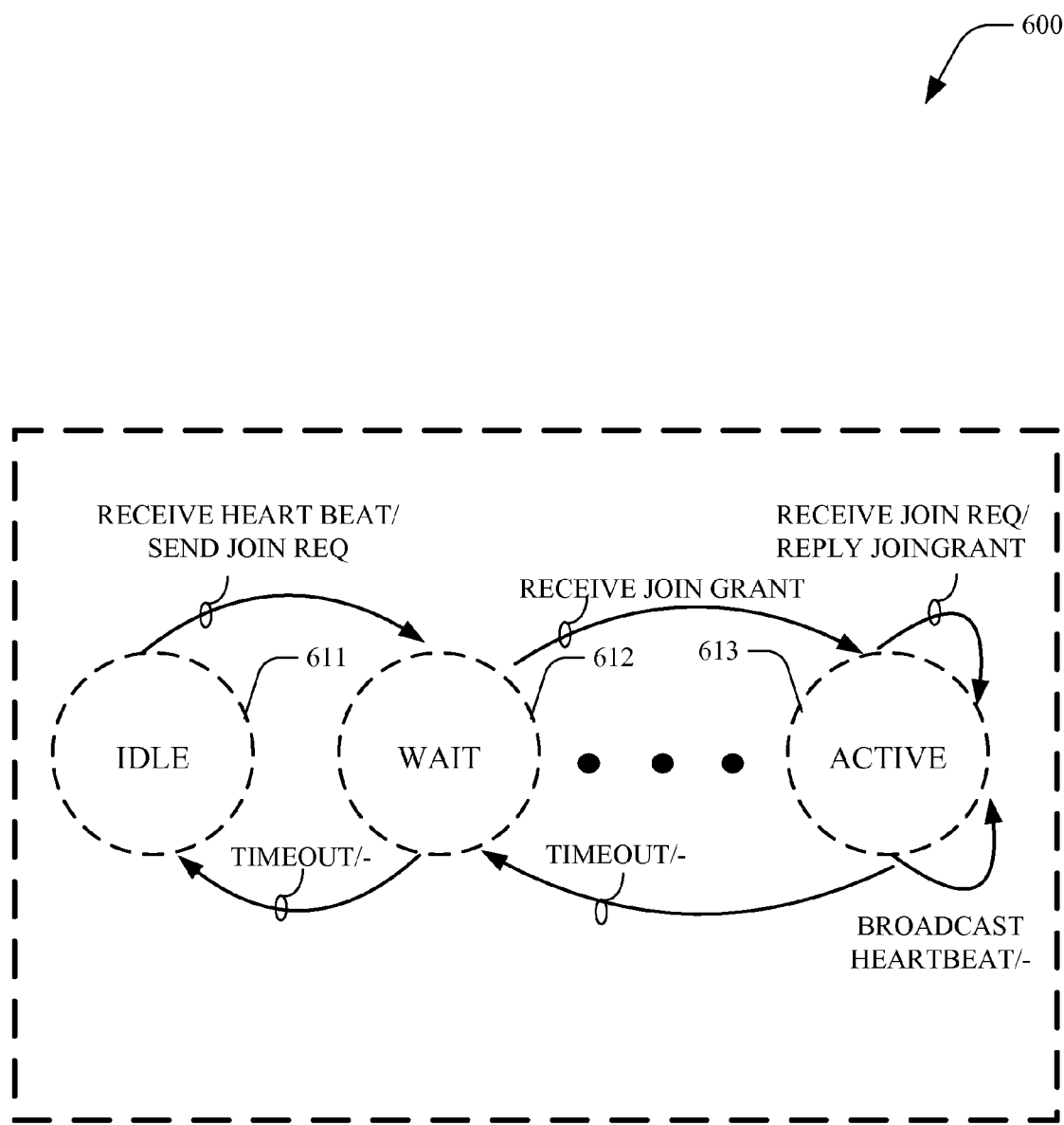
FIG. 6 illustrates a schematic block diagram for a state transition of data collection protocol in accordance with an aspect of the subject innovation.

In one aspect, the Data Collection Protocol constructs a routing tree that supports bidirectional, point-to-point communication between a gateway and any specific sensor (e.g., a Bi-tree). Gateways can initiate the BiTrees' construction by broadcasting HEARTBEAT messages. Upon receiving a HEARTBEAT message, non-tree nodes compete to join the tree. Once on the tree they can generate their own HEARTBEAT messages to recruit more nodes. HEARTBEATs include fields that represent the node's status, including the hop distance from the root, its parent node ID, and a list of children. Such children list is used to coordinate the transmission of HEARTBEAT messages as described in FIG. 6—which illustrates a schematic block diagram 600 for a state transition of data collection protocol of the subject innovation, wherein state transitions can be represented with condition/action notation in which a transition occurs when a condition is met and results in an action (or no action in case of "–"). In such environment control messages can include:

TABLE 1

Summary of topology control messages

| Message Type | Information Included |
| --- | --- |
| HEARTBEAT | Message Type |
| | Hop count |
| | LQI cost |
| | Path reliability |
| | Parent ID |
| | Children list |
| JOIN_REQ | Message Type |
| JOINRESP | Message Type |

As illustrated, the state transition for topology control can include a node that starts as a non-tree node in IDLE state 611. Such node can actively listen for HEARTBEAT messages from tree nodes, for example. Such HEARTBEAT message can contains fields representing the tree node's current state, such as its tree hop count, parent ID, and children list. Moreover, from the HEARTBEAT message, the node can decide whether it can attempt to act as a tree node's child. For example, the node can initially examine the children list and determines if the tree node has already reached the maximum number of children. Subsequently, it can access the link by obtaining information from two layers: namely; the physical layer and the network layer. At the physical layer, many modern radio chips, such as ChipCon CC2420, have features such as RSSI (Receive Signal Strength Indicator) and LQI (Link Quality Indicator), which can be implemented as part of a system of the subject innovation. A stable RSSI can provide estimation on the packet reception rate (PRR). As such, LQI can represent a chip error rate, which estimates links in data collection protocols, such as MultihopLQI in TinyOS, for example. One aspect of the subject innovation can initially filter out links with an RSSI lower than −75 dBm—which exhibit poor performance.

Moreover, the DCP of the subject innovation (e.g., a reliable data connection protocol—rDCP) can further consider the path reliability value in the HEARTBEAT message to filter out potentially unreliable paths (e.g., a threshold of 80%). In addition, tree nodes can calculate the path reliability value by keeping track of retransmission requests from the base station. In case of multiple potential links, rDCP can employ MultihopLQI's approach to translate raw link LQI values into the notion of link LQI costs. Thereafter, rDCP can add the link LQI costs to parent's path LQI cost in the HEARTBEAT message to produce the final path LQI cost. The node prefers the link with lower path LQI cost. After the node decides on the potential tree parent, it can send a JOIN_REQ message and transits to WAIT state 612.

Likewise, after receiving the JOIN_REQ message, a tree node can check whether a maximum number of children has been reached. If the tree node can support an additional child, it replies with the JOIN_GRANT message. Otherwise, it ignores the JOIN_REQ message. Moreover, upon receiving the JOIN_GRANT message, a node can become a tree node and transits to ACTIVE state 613. If the JOIN_GRANT message does not arrive within a predetermined time period, the node can transit back to IDLE state and listens for the HEARTBEAT message.

A tree node in ACTIVE state can further await for the HEARTBEAT message from parent, which triggers it to beacon the HEARTBEAT message. The HEARTBEAT message can serve as an explicit indication to the parent and the children that the node is still alive.

For example, a non-tree node stays initially in the SCAN state, actively listening for HEARTBEAT messages from tree nodes. The node then selects a parent based on the following process: first, the node checks the children list and determines whether the potential parent has already reached the maximum number of children. If not, it evaluates the path quality to the gateway via this upstream node by computing expected total transmission count (ETTC) as below:

$$ETTC_j = \sum_{l \in P} \frac{1}{ELDR_l} = ETTC_i + \frac{1}{ELDR_{i,j}}$$

where j is the current node; i is its potential parent; P is the path from j to the gateway via i, and $ELDR_l$ is the estimated link delivery ratio of link l. To compute ETTC3 recursively, the ETTCZ is included in the HEARTBEAT message. However, estimating $ELDR_{i,j}$ directly from HEARTBEATs can require multiple message rounds. As explained earlier, to reduce control message overhead, the take advantage of Link Quality Indicator (LQI) available from modern radio chips such as CC2420. A piece-wise linear approximation can be employed to estimate a link's ELDR based on its LQI.

Such ETTC metric essentially represents the expected number of radio transmissions it takes to reliably deliver one end-to-end message along a specific path. At the end of the SCAN state, the node selects the upstream node with the smallest ETTC as its potential parent and initiates a tree join request. The parent also estimate the link quality from this potential child in the upstream direction before replying with a JOIN GRANT message. Otherwise, the tree join operation times out. Such two way hand shaking enables various advantages such as: serving as an explicit agreement between the parent and the child node that both have the resources to relay messages for each other; and ensuring the link quality in both directions, as it is known that wireless links suffer from asymmetry, for example.

It is to be appreciated that the gateway can send periodic HEARTBEAT messages. A node that has just joined the tree waits for the second round HEARTBEAT message from its parent, which triggers the node to broadcast its own HEARTBEAT message. The HEARTBEAT message serves as an explicit indication to the parent and the children that the node is still alive. If a node stops hearing from its parent for too long, it assumes the current parent is down and transits back to the SCAN state. Similarly, on the parent's side, it abandons a child if the timer expires.

With respect to the Beaconing operation, typically since a large-scale network can generate a significant amount of network traffic, managing traffic is crucial in reducing radio interference. An example of such traffic is from beaconing the HEARTBEAT message. In general, beaconing is an integral part of topology control—yet as explained earlier having all nodes beacon at approximately the same time can create massive collisions and potentially render beacons useless.

In one aspect, the rDCP's beaconing algorithm of the subject innovation can include a hybrid of contention-based and TDMA-based approach. Such an approach leverages the fact that a tree node has a parent and children to introduce the notion of local TDMA schedule. As mentioned before, the HEARTBEAT message carries children list. This children list serves as a local TDMA schedule, and children calculate their beaconing time slot based on the index on the list. However, since local TDMA schedule does not guarantee that nodes under two different branches do not collide, nodes then randomly pick a time within their own time slot.

According to a further aspect, and to prevent beaconing from interfering with data download, the base station is responsible of initiating the beaconing as the tree root. In one particular example, tree nodes can broadcast the HEARTBEAT message only after they hear one from the parent. Since the base station also initiates data download, it can schedule beaconing and data download to avoid interference.

For example, a hybrid mechanism for HEARTBEAT transmission can be employed, wherein a fixed-length time frame T can be assigned to a node's children. As explained earlier, a HEARTBEAT message carries the node's complete list of its children. Such list can serve as a local TDMA schedule, wherein the $i^{th}$ child employs time slot as $$\left(\frac{T}{n_{max}} i, \frac{T}{n_{max}} (i+1)\right)$$

where $n_{max}$ represents the maximum number of children a node can have. The remaining time slots in T are employed by non-tree nodes to initiate the two-way handshake. The grand children start sending HEARTBEATs after T expires, therefore ensuring nodes of different generations receive exclusive time slots. Such an arrangement can reduce collisions by having nodes randomly pick a time within their allocated time slots. Because tree nodes initiate their HEARTBEATs only after they hear from their parents, the gateway can control the pace of different rounds of HEARTBEATs based on application-level requirements. For example, a high end-to-end reliability indicates good data collection routes, thus the interval between HEARTBEATs can be substantially low. Otherwise, the basestation can probe the network more frequently.

Regarding data download, sensors can be sampled periodically, and as explained earlier measurements can be stored on the external flash as log entries. In one aspect, the subject innovation can employ a centralized pull approach to download such log entries from each node. A pull-based approach can readily integrate with end-to-end data reliability mechanisms. In addition, since the base station initiates data transfers, it can control the amount of traffic in the network to minimize the interference.

Examples of topology collection messages can include:

TABLE 2

Summary of topology collection messages

| Message Type | Information Included |
|---|---|
| CHILD_REQ | Message Type |
| CHILD_RESP | Message Type |
| | Children List |

In addition, the rDCP of the subject innovation can employ request-response model to initiate data download, and downstream control messages are encapsulated in source-routing packets. Source-routing places the burden of constructing forwarding path on the base station, and thus can minimize the load and the state needed on the resource-constrained motes. In general, prior to the base station contacting nodes, it needs the knowledge of the topology constructed by the motes in the network. The rDCP of the subject innovation can specify the CHILD_REQ message for the base station to collect the children list from each node. Merging the children lists essentially reconstructs the network topological map and reveals the path to all nodes in the network. Collecting children list can be a recursive process. As the root of the data collection tree, the base station has a list of children, which are effectively the first-hop tree nodes. These nodes can in turn provide their own children list in the CHILD_RESP message, and this process repeats until the base station has traversed all the nodes. By employing the request-response model, the base station collects the children list from one node at a time. Upon receiving the CHILD_REQ message, intermediate nodes check the path in the packet for the next hop. Since upstream packets take the reverse path, intermediate nodes also look up and cache the previous hop. Gathering topology information can be deemed important for the data download, as an incomplete node list prevents the base station from downloading from all nodes. If the base station does not receive the CHILD_RESP message within a window of time, it resends the CHILD_REQ message up to a number of times.

In a related aspect messages associated with a data streaming can include

TABLE 3

Summary of data streaming messages

| Message Type | Information Included |
|---|---|
| STREAM_REQ | Message Type |
| | Read pointer |
| | Read offset |
| | Read range |
| STREAM_RESP | Message Type |
| | Read pointer |
| | Read |

The base station can initiate data transfers by sending the STREAM_REQ message. The STREAM_REQ message implements data block streaming by carrying the starting log address to read and the number of entries to stream. Similar to the CHILD_REQ message, the STREAM_REQ message is a downstream source-routing packet where the base station determines the forwarding path from the topology information it has collected. To reduce the amount of overhead, nodes fill the STREAM_RESP message with as many log entries as possible. Each STREAM_RESP message can be stamped with the address of the first log entry in the message, which allows the base station to keep track of the progress and initiates recovery for end-to-end reliability.

The subject innovation enables the routing protocol to deliver data with integrity and end-to-end reliability. The rDCP can address such requirement with three mechanisms. The first mechanism is 16-bit Cyclic Redundancy Checks (CRCs). rDCP performs CRC at both packet level and application-payload level CRC. A message is discarded if either CRC fails. This redundant data integrity check ensures the data that arrives at the base station is correct.

A further mechanism that can be implemented as part of the subject innovation, is a delay estimator for estimating the inter-packet delay necessary to minimize the streaming interference. In general, radio is essentially a broadcast medium, and concurrent packet transmissions within the same radio coverage can potentially interfere with each other. Therefore, the source node needs to space two packets with some delay to minimize the interference. The rDCP estimates such delay by overhearing its CHILD_RESP to the base station. In particular, nodes measure the time from the moment they send the message until the last time they overhear the same message being relayed upstream. Since different parts of a path can experience different level of radio coverage interference, a node typically needs to know the maximum delay among all of its upstream nodes. rDCP piggy-backs such information in the downstream CHILD_REQ message. When a node relays the CHILD_REQ message, it compares the delay value in the message against its own value, and updates the message with the maximum of the two.

Another mechanism that can be employed in conjunction with the subject innovation, is a negative acknowledgement (NACK). After a node finishes streaming the requested data block, the base station scans the received data for gaps. Subsequently, the base station attempts to sequentially fill the gap by sending the STREAM_REQ message with the starting address and the size of the gap. If the base station could not fill all gaps after a number of retries, it can store only the first complete data block and caches the rest of the received data for the next round.

With respect to Data Timestamp, the subject innovation can rely on a substantially large number of sensors to perform fine-grain monitoring. For collected measurements to become useful, they need to be time-correlated across different sensors and taken at approximately the same time. The rDCP of the subject innovation can synchronize the global clock in the network. Accordingly, before a mote logs a sample, it stamps the sample with the current global time. The rDCP assumes the base station maintains the global clock—such assumption can be deemed reasonable, because the base station is a combination of mote and PC, and protocols such as Network Time Protocol (NTP) are readily available on PC. The rDCP piggy-backs the global time onto the HEARTBEAT message. To minimize the delay between when the message is stamped and when the message is received, rDCP pushes the time stamping down to the MAC layer and advances the time stamp by the message transmission time. Upon receiving the HEARTBEAT message from parent, the tree node creates a synchronization point, which is essentially a pair of global and local time stamps. Typically, if all clocks' frequency and drift are identical, a single synchronization point would suffice in translating local time to global time. However, since the offset between two clocks changes linearly in reality, at least two synchronization points are necessary. The ratio of the difference between two global time stamps and the difference between two local time stamps is effectively the slope of the clock drift curve. Every time the mote needs a global time stamp, it can fit the local time stamp into the curve to generate the corresponding global time stamp.

Figure 7:
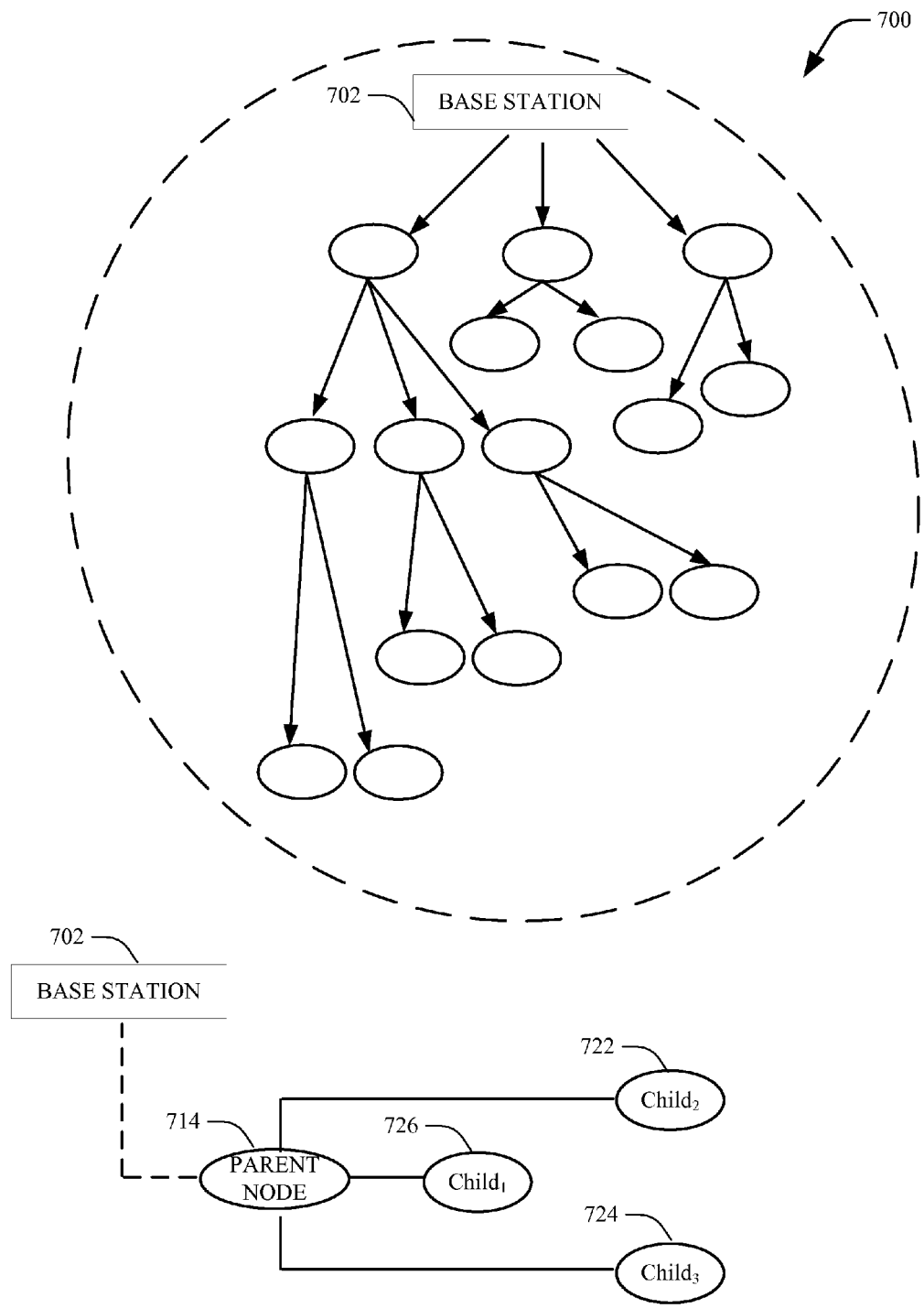
FIG. 7 illustrates a wireless network of sensors as nodes, wherein such tree structure includes the base station as the root node.

FIG. 7 illustrates a wireless network 700 of sensors as nodes, wherein such tree structure include the base station as the root node 702. Moreover, the base station 702 can require aid of other sensors to communicate with the out-of-range sensors, wherein the sensors can be distributed among a plurality of communication channels that can change based on the dynamic formation of the wireless network. For example, the child nodes 722, 724, 726 can subsequently identify themselves to a parent node 714 (e.g., a node that is already part of the wireless network 700 and in communication with the base station 702—either directly or indirectly.) The data collection protocol of the subject innovation can exploit the self-awareness capabilities of nodes 714, 722, 724, 726 in selection of tree structures that form the wireless network during communication with the base station 702.

Figure 8:
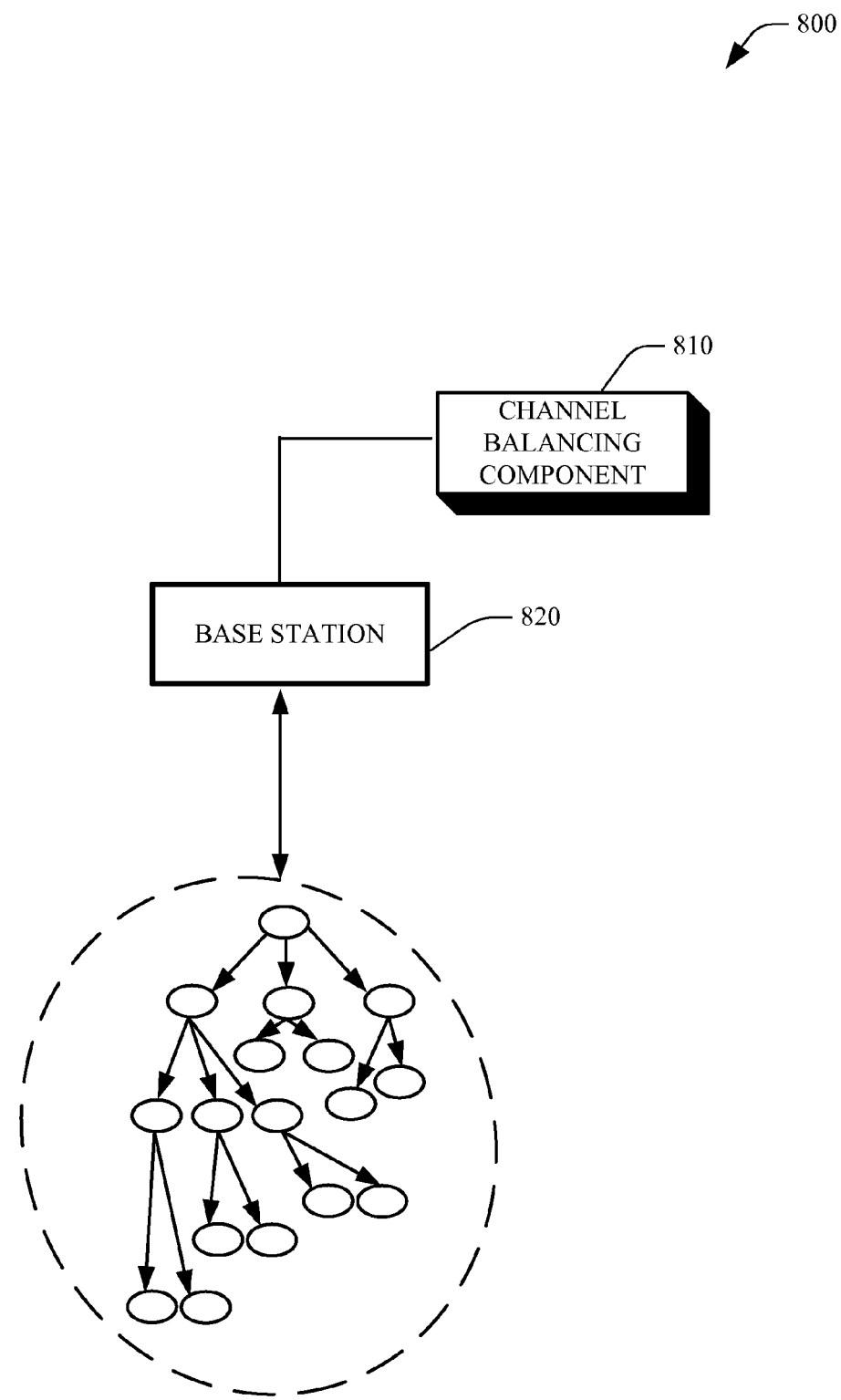
FIG. 8 illustrates a channel balancing component that interacts with a base station in accordance with an aspect of the subject innovation.

FIG. 8 illustrates channel balancing component 810 that is associated with a base station 820 in accordance with an aspect of the subject innovation. Such channel balancing component 810 can be employed to facilitate inferring and/or determining when, where, how to implement channel distribution among sensor in accordance with an aspect of the subject innovation, (e.g., to direct nodes to use appropriate RF channels).

For example, as sensors and gateways join/leave the network, size of various BiTrees can become unbalanced. Since gateways coordinate data collections, the number of nodes within a tree does not significantly affect the download time from individual nodes. It does however affect more significantly overall time A to finish one round of data collection from all the nodes, thereby affecting application-level performance. Thereby, balanced tree sizes yield better overall collection delay.

As such, the subject innovation can employ a distributed algorithm for balancing tree sizes. Once observing large differences across the Δ's of different trees, a gateway initiates the channel-balancing process by sending the START BAL message that propagates through the tree. To avoid network instability, rDCP can employ two mechanisms: (i) restricting the channel-balancing process to the gateway with the largest data collection delay, and (ii) tolerating predetermined amount of imbalance in Δ. Assuming $$\Delta_{avg} = \frac{\sum_{b \in B} \Delta_b}{|B|}$$

represents the average delay among all trees. A gateway b* starts the channel-balancing process only if the following condition is met:

$$\Delta_{b^*} - \Delta_{avg} > \delta, \text{ and}$$

$$b^* = \arg\max_{b \in B}(\Delta_b)$$

where B is the set of all the gateways and δ is a threshold parameter that controls the amount of tolerable imbalance. The START BAL message contains the switching probabilities to the different channels. Switching probabilities are defined to be higher for more underutilized channels. With probability $$P_i = \frac{\Delta_{avg}}{\Delta_{b^*}}$$

a node in b* will decide to switch. The probability $P_i$ to switch to the channel of basestation $i \neq b^*$ is calculated as:

$$P_i = 0, \text{ if } \Delta_i > \Delta_{avg}$$

$$P_i = \frac{\Delta_{b^*} - \Delta_{avg}}{\Delta_{b^*}} \cdot \frac{\Delta_{avg} - \Delta_i}{\sum_{b \in B \text{ and } \Delta_b < \Delta_{avg}}(\Delta_{avg} - \Delta_b)}$$

if $\Delta_i < \Delta_{avg}$

Intuitively, one can attempt to migrate the extra nodes at gateway b* to underloaded gateways based on their degrees of under-utilization. Once receiving a START BAL message, a node calculates the target channel based on the switching probabilities. More nodes will attempts to join the tree with less number of nodes. If the node can not find a parent in the target channel, it returns to its original channel As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events.

As used in herein, the terms "component," "system" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
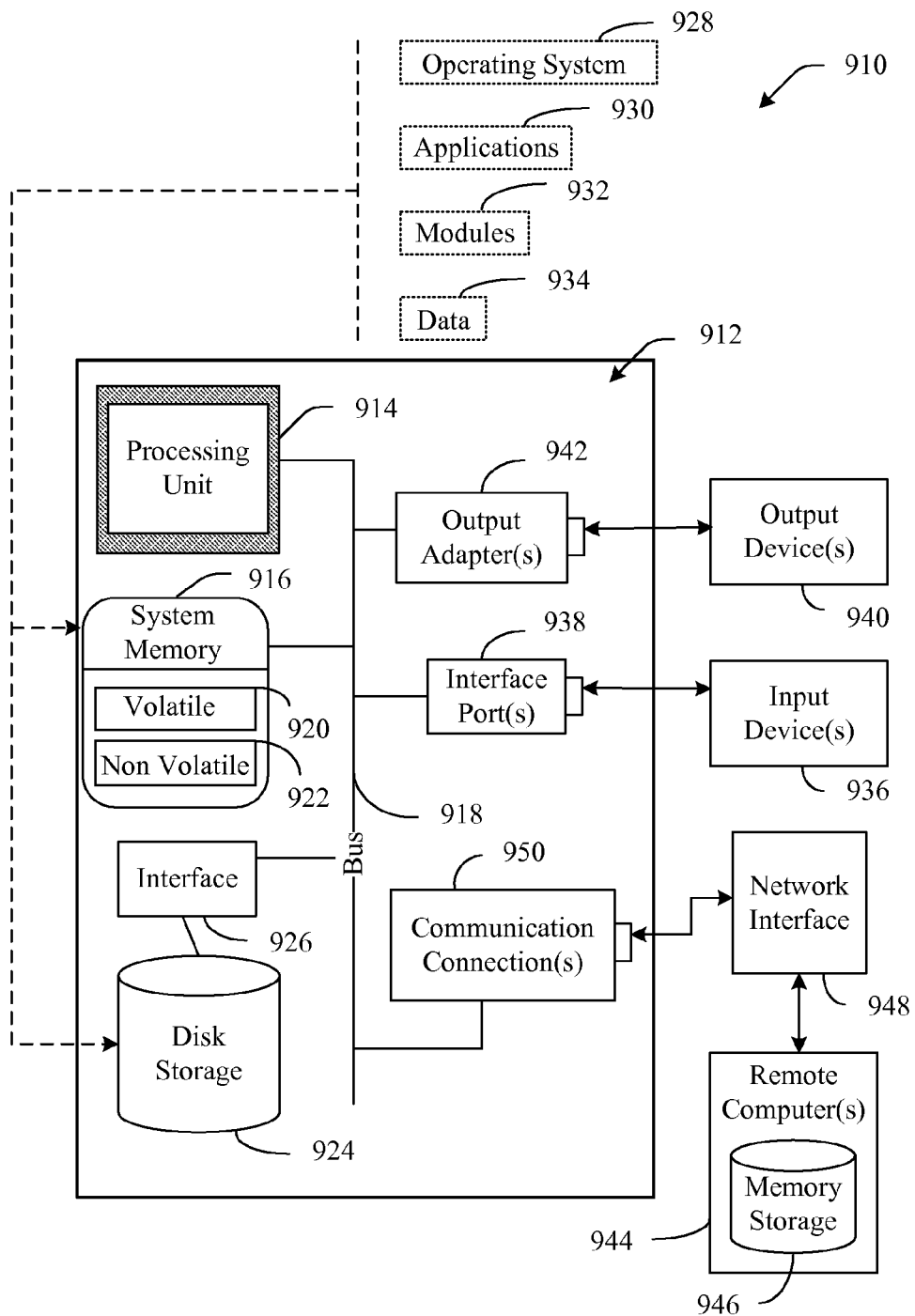
FIG. 9 illustrates a schematic block diagram of a suitable operating environment for implementing aspects of the subject innovation.
Figure 10:
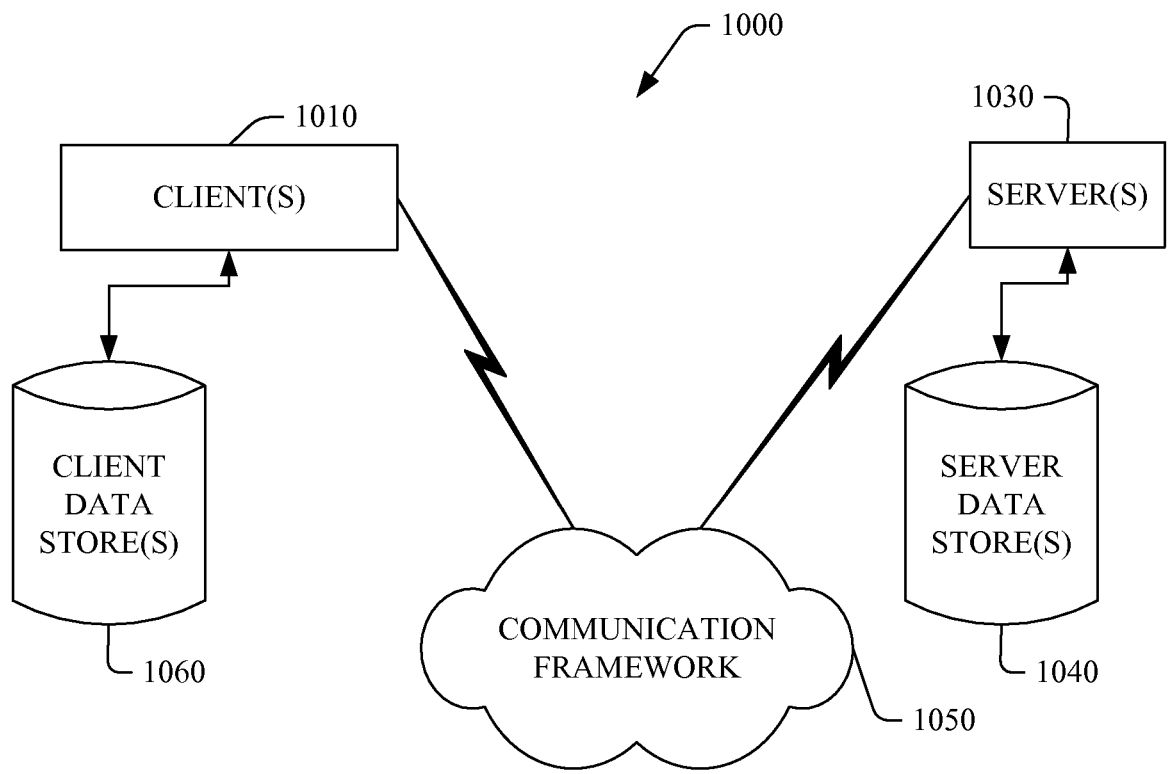
FIG. 10 illustrates a further schematic block diagram of a sample-computing environment for the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed as part of a data collection protocol in accordance with an aspect of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system, comprising:
 a topology control component configured to distribute sensors as nodes among a dynamic wireless network in a form of a tree structure;
 a data retrieval component configured to retrieve data from the sensors, the topology control component and the data retrieval component being part of a communication protocol employed by a base station to communicate with the sensors; and
 a storage medium associated with at least one of the sensors for local storage of the data during a transition time for change of the dynamic wireless network.

2. The computer implemented system of claim 1, wherein the topology control component further comprises a tree building component configured to generate the tree structure.

3. The computer implemented system of claim 2, wherein the topology control component further comprises a channel scanning component configured to track the nodes within the tree structure.

4. The computer implemented system of claim 3, wherein the topology control component further comprises a link quality assessment component configured to evaluate quality of communication with the base station.

5. The computer implemented system of claim 4, wherein the base station represents a root node of the tree structure.

6. The computer implemented system of claim 5, wherein a communication of the base station with a child node is performed through a parent node.

7. The computer implemented system of claim 6, further comprising a channel balancing component configured to direct nodes to available wireless channels.

8. A computer implemented method, comprising:
 forming a dynamic wireless network of sensors from a plurality of tree structures;
 evaluating quality for communication of the sensors with a base station;
 moving a sensor in or out of the dynamic wireless network;
 balancing distribution of the sensors among channels of the dynamic wireless network; and
 storing data local to one of the sensors during a transition time for modifying the dynamic wireless network.

9. The computer implemented method of claim 8, further comprising communicating, by at least one of the sensors, with the base station through other sensors.

10. The computer implemented method of claim 9, further comprising regulating distribution of the sensors among the plurality of tree structures.

11. The computer implemented method of claim 9, further comprising coordinating among the sensors to transmit data to the base station.

12. The computer implemented method of claim 9, further comprising sending a beacon, by the base station, throughout the dynamic wireless network.

13. The computer implemented method of claim 12, further comprising activating an idle sensor though the beacon.

14. The computer implemented method of claim 13, further comprising selecting a parent node based at least one of: a Received Signal Strength Indicator (RSSI) or Link Quality Indicator (LQI).

15. The computer implemented method of claim 14, further comprising determining which channel a sensor is to reside on when communicating with the base station.

16. The computer implemented method of claim 14, further comprising identifying a child node to the parent node.

17. The computer implemented method of claim 9, further comprising evaluating quality of a communication link from at least one of the sensors to the base station.

18. One or more computer storage media storing computer executable instructions, which, when executed by the computer, cause the computer to perform a method, the method comprising:
 distributing sensors as nodes among a dynamic wireless network in form of a tree structure;
 retrieving data from the sensors and sending the data to a base station; and
 storing the data local to one of the sensors during a transition time for modifying the dynamic wireless network.

* * * * *